United States Patent [19]

Costello

[11] 4,031,712
[45] June 28, 1977

[54] COMBINED ABSORPTION AND VAPOR-COMPRESSION REFRIGERATION SYSTEM

[75] Inventor: Frederick Alexander Costello, Herndon, Va.

[73] Assignee: The University of Delaware, Newark, Del.

[22] Filed: Dec. 4, 1975

[21] Appl. No.: 637,839

[52] U.S. Cl. .................................................. 62/483
[51] Int. Cl.² ........................................ F25B 15/00
[58] Field of Search ................... 62/483, 476, 332

[56] References Cited
UNITED STATES PATENTS

| | | | |
|---|---|---|---|
| 2,307,380 | 1/1943 | Baker | 62/101 |
| 2,446,988 | 8/1948 | Flukes et al. | 62/483 |
| 2,548,699 | 4/1951 | Bernat et al. | 62/483 |
| 3,046,756 | 7/1962 | Whitlow et al. | 62/476 |
| 3,495,420 | 2/1970 | Loweth et al. | 62/476 |
| 3,717,007 | 2/1973 | Kuhlenschmidt | 62/483 |

*Primary Examiner*—Lloyd L. King

[57] ABSTRACT

A conventional absorption refrigeration system is combined in series with a vapor compression refrigeration system to effect the improvement, which comprises compressing the vapor refrigerant from the evaporator before introducing it into the absorber and/or compressing the vapor refrigerant from the generator before introducing it into the condenser. One bypass permits direct operation as a vapor-compression refrigeration system. Bypasses also permit direct operation as an absorption system.

6 Claims, 1 Drawing Figure

U.S. Patent   June 28, 1977   4,031,712
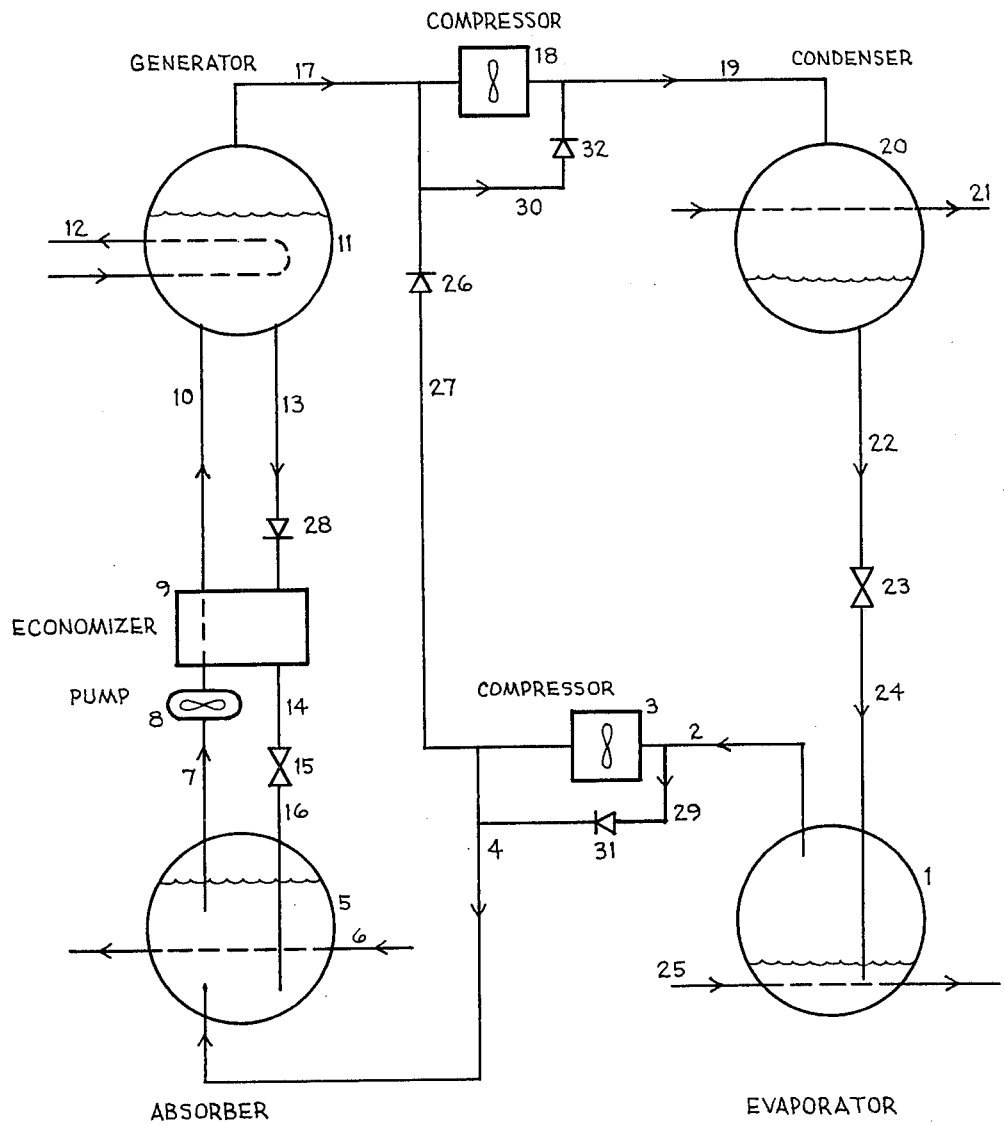

COMBINED ABSORPTION AND VAPOR-COMPRESSION REFRIGERATION SYSTEM

BACKGROUND OF THE INVENTION

The present invention relates to a refrigeration system such as might be used to cool air or water for refrigeration or for air conditioning purposes.

As is well known, refrigeration systems generally comprise either (a) a vapor compressor that compresses a gaseous refrigerant such as a fluorinated hydrocarbon, a condenser to condense the vapor to liquid form, an expansion valve to reduce the pressure of the liquid, and an evaporator to cool the air or water by evaporation of the refrigerant; or (b) an absorber containing an absorbent such as a solution of lithium bromide and water that absorbs the gaseous refrigerant such as water vapor, a pump that raises the pressure of the solution after absorption of the vapor, a generator in which the solution is heated to drive the refrigerant vapor off at high pressure, a condenser in which the high-pressure vapor is cooled until it condenses into liquid form, and expansion valve by which the liquid is brought to a lower pressure, and an evaporator to cool the air or water by evaporation of the refrigerant.

The disadvantage of the vapor compression system described under (a) above is that large amounts of electric power are required to compress the vapor, so operating expenses are high and a valuable energy resource is consumed. The disadvantage of the absorption system described in (b) above is that high temperatures are required to drive the refrigerant out of the solution in the generator. In addition, a highly efficient coolant such as cold water is required in the condenser and the absorber. The high temperatures of the generator are attained usually by combustion of fossil fuels, so operating expenses are high and a valuable energy resource is consumed. Only with large, costly, inefficient collector systems can these high temperatures be attained with a plentiful resource such as solar energy. The need for an efficient coolant for the absorption system is a serious disadvantage because water is also a valuable resource that is thereby at least in part consumed via thermal pollution and via chemical pollution due to the use of corrosion inhibitors.

OBJECTS OF THE INVENTION

The primary object of the present invention is to provide a refrigeration system, including both a process and apparatus, from home air conditioning and other air conditioning and refrigerating applications, which is both practical and more conserving of energy and of water than systems heretofore proposed or used.

Another object of the present invention is to provide a practical means for using solar energy to power an air-conditioning and/or refrigerating system. Part of this practicality is due to the capability of the system to function satisfactorily while being supplied with a heating fluid that is at the moderate temperature such as attainable with low-cost solar collectors and with low-pressure steam.

Still another object of the present invention is to provide an absorption type of refrigeration system that can be economically cooled with such an inefficient coolant as air.

SUMMARY OF THE INVENTION

In accordance with the present invention one or two compressors are added to a conventional absorption-refrigeration system. A compressor may be added so as to provide for compressing the vapor refrigerant from the evaporator of the refrigeration system before introducing it into the absorber or a compressor may be added so as to provide for compressing the vapor refrigerant from the generator of the refrigeration system before introducing it into the condenser. The preferred modification includes compressors added at both points.

Hence in the preferred modification there is connected in series a compressor for the refrigerant vapor to pass same into an absorber containing an absorbing substance for said refrigerant vapor, a pump for applying pressure to the absorbing substance containing the refrigerant and passing same into a generator where the refrigerant is driven from the absorbing substance by application of heat, a second compressor to compress the refrigerant leaving the generator and passing same into a condenser where it is liquified, an expansion valve for releasing the pressure on the liquified refrigerant as it passes into an evaporator where air or water is cooled by evaporation of the refrigerant and the refrigerant vapor withdrawn by the first mentioned low-pressure compressor for recycling in the system.

The following will illustrate the invention in greater detail. Referring to the appended drawing which is a schematic flow sheet of the process and apparatus, a refrigerant such as water vapor is withdrawn from the evaporator 1 at a pressure of approximately 0.4 PSI through conduit 2 by compressor 3 where the pressure is increased for example 0.2 to 1 PSI and the vapor passed through conduit 4 into absorber 5 where it is absorbed in a concentrated solution of lithium bromide and water. If desired, the solution in the absorber 5 may be cooled by means of heat exchanger 6. The solution containing the dissolved refrigerant is withdrawn from the absorber 5 through conduit 7 and pumped by pump 8 via conduit 10 through heat exchanger (economizer) 9 into the generator 11. The pump 8 increases the pressure on the liquid to about 10 PSI so it may pass into the generator. Heat introduced from a source such as the sun or low-pressure steam into heat exchanger 12 causes the evaporation of the refrigerant, water, from the solution in generator 11. The concentrated solution of lithium bromide and water is returned via conduit 13 containing check valve 28 through the heat exchanger 9 and conduit 14 to the expansion valve 15 and conduit 16 to the absorber 5. In the heat exchanger 9 the concentrated absorbent is cooled while the absorbent containing refrigerant is heated. The expansion valve 15 reduces the pressure on the solution to that in the absorber 5.

In this illustration the refrigerant in the generator, namely the water vapor, 11 is removed through conduit 17 and compressed by compressor 18 to increase its pressure, for example 0.2 to 1 PSI, above the pressure in the generator. The water vapor is then passed through conduit 19 into condenser 20 wherein it is cooled by the heat exchanger 21 to condense same into liquid water. The liquid water then passes through conduit 22, expansion valve 23 and conduit 24 into evaporator 1. The evaporation of the water in evaporator 1 in heat exchange relationship with air or water in heat exchanger 25 effects the necessary cooling provided by the refrigeration system.

The above system permits an optimal balance between the amount of energy supplied thermally from the solar collector and the amount of energy supplied by electricity to compress the refrigerant vapor. Also a coolant such as air may be used in 6 to carry away the heat generated in the absorber 5, as well as in 21 to remove the heat of condensation in condenser 20.

During times when insufficient solar energy is available to drive the present invention, it can be driven as a conventional vapor-compression system using electrical power to increase the output pressure of compressor 3 to approximately 10 PSI when using water vapor, the vapor passing through conduit 27 and check valve 26. Check valve 28 prevents flow from absorber to generator during this mode of operation. Thus, cooling capability is not lost during days of low solar insolation.

During times when abundant solar energy is available to drive the present invention, it can be driven as a conventional absorption-refrigeration system using only solar heat and pump 8 to bring the vapor to the higher pressure of approximately 10 PSI when using water vapor. Under these conditions, compressors 3 and 18 are not driven and the vapor is permitted to flow through the stationary compressors from evaporator 1 to absorber 5 and from generator 11 to condenser 20. As an alternative, conduits 29 and 30 can be used to bypass the vapor around the compressors, in which case check valves 31 and 32 would be used.

The subject system can use the following typical refrigerant/absorbant combinations, with the advantage indicated:

| Absorbant | Refrigerant | Advantage |
| --- | --- | --- |
| Lithium Bromide | Water | Operates at a high temperature |
| Lithium Bromide/Zinc Bromide | Methanol | Smaller Equipment |
| Water | Ammonia | Small pressure differences |
| Sodium Thiocyanate | Ammonia | Better performance |
| Dimethyl Ether of Tetraethylene Glycol | Fluorocarbons | More compatible with compressor materials |

All but the first can operate at a temperature below the freezing point of water. The first, namely lithium bromide - water, provides the most operating experience relative to the prior art absorption systems.

The present invention differs from the conventional absorption-refrigeration system by the introduction of at least one compressor and preferably two into the system. These compressors are the key to the advancement offered by the invention. One compressor raises the pressures in the absorber and the other, in the condenser, thereby increasing the temperatures in these two units and thereby permitting the use of air as a coolant. Also one compressor decreases the pressures in the evaporator and the other, in the generator, thereby decreasing the temperatures in these two units. The lower temperature in the evaporator permits the attaining of lower temperatures in the air or water that is to be cooled. The lower temperature in the generator permits the use of lower-temperature heating fluids such as low-pressure steam and low-temperature liquid such as could be supplied by an inexpensive solar collector. For example, the present invention can operate at generator temperatures below 180° F whereas conventional systems require temperatures above 240° F. The present invention can also operate with absorber and condenser temperatures above 120° F, whereas conventional systems require temperatures below 80° F.

Another advantage of the present invention is that in each application the most economical combination of heat addition and compressor power can be used. In addition, during times of low cooling needs, the present invention can operate either as a conventional absorption-refrigeration system or as a conventional vapor-compression system, thereby achieving added advantages.

Other embodiments of the present invention, whereby compressors are included in absorption systems such as have been variously proposed, are readily apparent to those skilled in the art of refrigeration system design.

Novel features and advantages of the present invention in addition to those mentioned above will become more apparent to those skilled in the art. Accordingly, changes and modifications may be made without departing from the invention in its broader aspects. The aim of the appended claims, therefore, is to cover all such changes and modifications as fall within the true spirit and scope of the invention.

1. In a closed cyclic absorption-refrigeration system using in combination
 a. means for absorbing a vapor refrigerant in an absorbent
 b. means for increasing the pressure on the absorbent containing the refrigerant
 c. means for heating the absorbent-refrigerant mixture to drive off the refrigerant as a vapor
 d. means for cooling said refrigerant vapor to condense same to a liquid
 e. means for reducing the pressure on said liquid to permit same to evaporate
 f. heat exchange means for cooling fluids outside the system by the evaporation of the refrigerant and
 g. means for recycling the refrigerant vapor to the said absorbing means
the improvement which comprises a compressor for increasing the vapor pressure of the refrigerant vapor after it leaves the heat exchange means and before it is recycled to said absorbing means, and a compressor for increasing the vapor pressure of the refrigerant vapor after it is driven off from the absorbent-refrigerant mixture and before it enters the means for cooling to condense the refrigerant vapor.

2. In a closed cyclic absorption-refrigeration system using in combination
 a. means for absorbing a vapor refrigerant in an absorbent
 b. means for increasing the pressure on the absorbent containing the refrigerant
 c. means for heating the absorbent-refrigerant mixture to drive off the refrigerant as a vapor
 d. means for cooling said refrigerant vapor to condense same to a liquid
 e. means for reducing the pressure on said liquid to permit same to evaporate
 f. heat exchange means for cooling fluids outside the system by the evaporation of the refrigerant and
 g. means for recycling the refrigerant vapor to the said absorbing means the improvement which comprises a compressor for increasing the vapor pressure of the refrigerant vapor after it is driven off from the absorbent-refrigerant mixture and before it enters the means for cooling to condense the refrigerant vapor.

3. The refrigeration system of claim 1 having a bypass conduit with a check valve that would permit operating of means $d$, $e$, and $f$ of the system without the operation of the remaining means.

4. The refrigeration system of claim 2 having a bypass conduit with a check valve that would permit operating of means $d$, $e$, and $f$ of the system without the operation of the remaining means.

5. The refrigeration system of claim 1 have a bypass conduit with a check valve that would permit operating of means $a$, $b$, $e$, $c$, $e$, $f$ and $g$ without operating of the means for increasing the vapor pressure.

6. The refrigeration system of claim 2 having a bypass conduit with a check valve that would permit operating of means $a$, $b$, $c$, $d$, $e$, $f$ and $g$ without operating of the means for increasing the vapor pressure.

* * * * *